US008777751B2

(12) United States Patent
Behmaram-Mosavat et al.

(10) Patent No.: US 8,777,751 B2
(45) Date of Patent: Jul. 15, 2014

(54) SEMI-SYNCHRONOUS MULTI-PARTICIPANT APPLICATION UPDATES

(75) Inventors: Fareed Behmaram-Mosavat, Winchester, MA (US); Jesse David Kurlancheek, Cambridge, MA (US); William Daniel Ogles, Cambridge, MA (US); Craig Anderson Lancaster, Mansfield, MA (US); Seth John Sivak, Cambridge, MA (US); Daniel O'Brien, Cambridge, MA (US)

(73) Assignee: Zynga Inc., San Francisco, CA (US)

( * ) Notice: Subject to any disclaimer, the term of this patent is extended or adjusted under 35 U.S.C. 154(b) by 447 days.

(21) Appl. No.: 13/244,729

(22) Filed: Sep. 26, 2011

(65) Prior Publication Data

US 2013/0059664 A1 Mar. 7, 2013

Related U.S. Application Data

(63) Continuation of application No. 13/224,912, filed on Sep. 2, 2011, now Pat. No. 8,562,443.

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .......................................... 463/42

(58) Field of Classification Search
USPC .......................................... 463/42
See application file for complete search history.

(56) References Cited

U.S. PATENT DOCUMENTS

2010/0056247 A1* 3/2010 Nicely et al. .................... 463/20

* cited by examiner

*Primary Examiner* — Kevin Y Kim
(74) *Attorney, Agent, or Firm* — Kenyon & Kenyon LLP

(57) ABSTRACT

Individual participants in a multi-participant collaborative computing application may be sent intermittent updates of actions taken by other participants. These updates need not be sent to a participant's device until the participant has interacted with a specified object in the application. The participant's device may then be sent an update including object interactions of the other participants occurring since the participant's previous object interaction. The update may be used to periodically inform the participant of the actions taken by the other participants during the period between the participant's interactions.

15 Claims, 5 Drawing Sheets

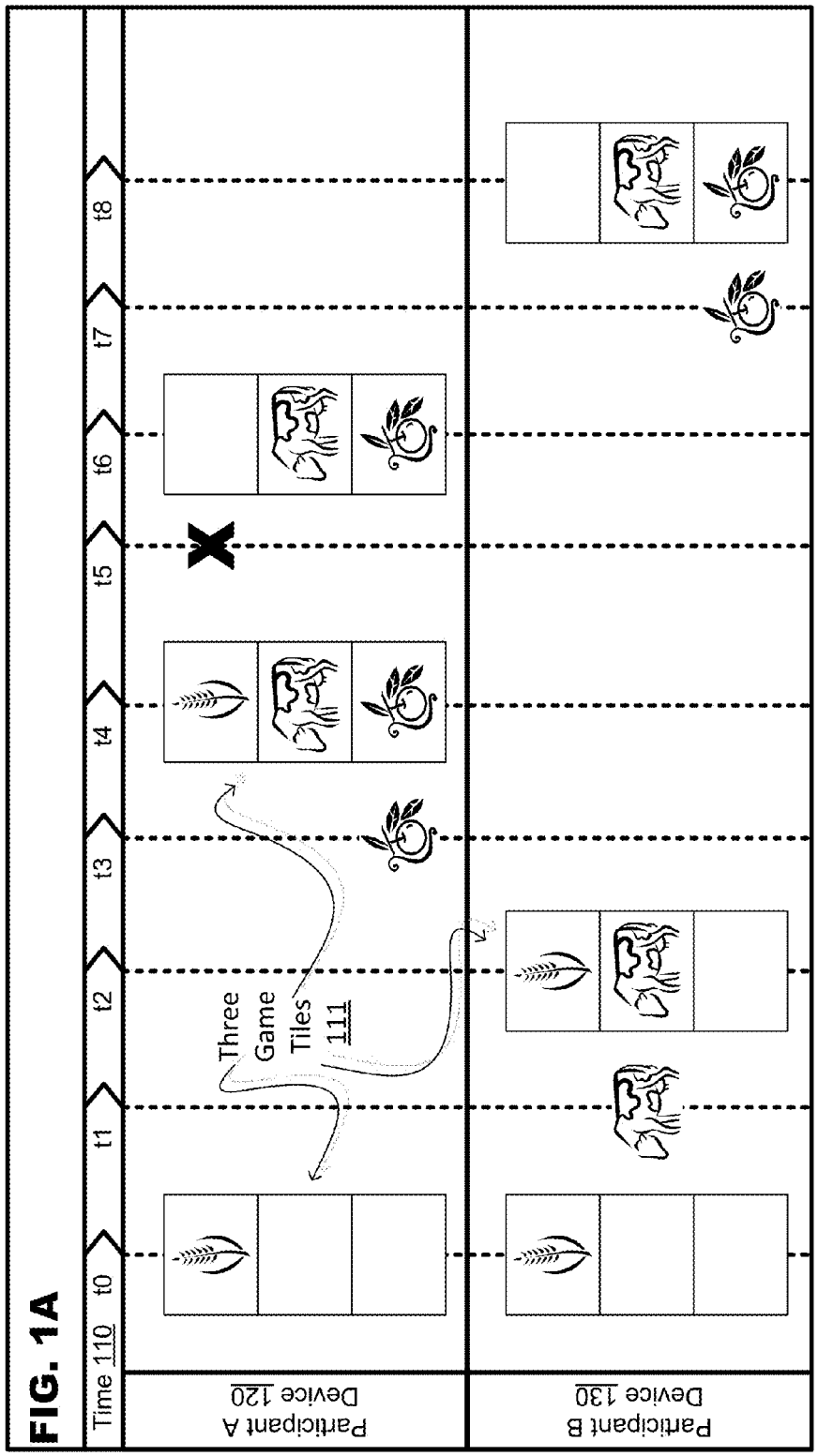

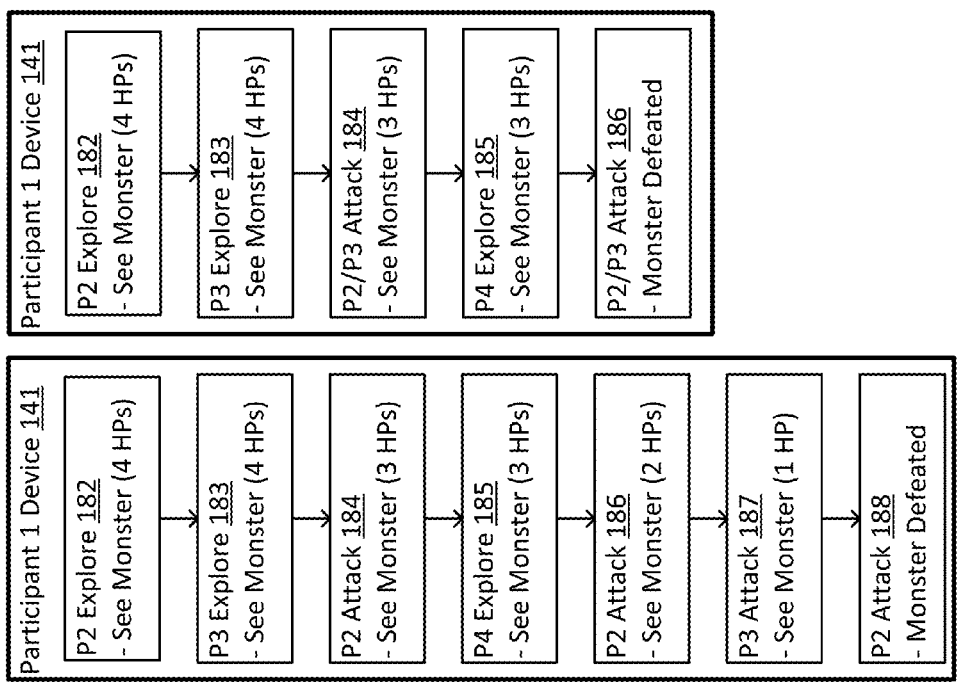
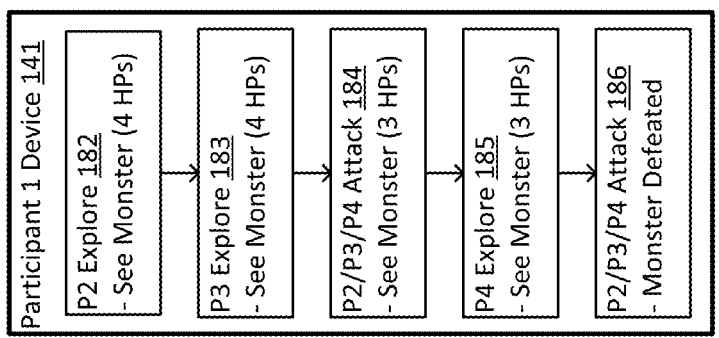
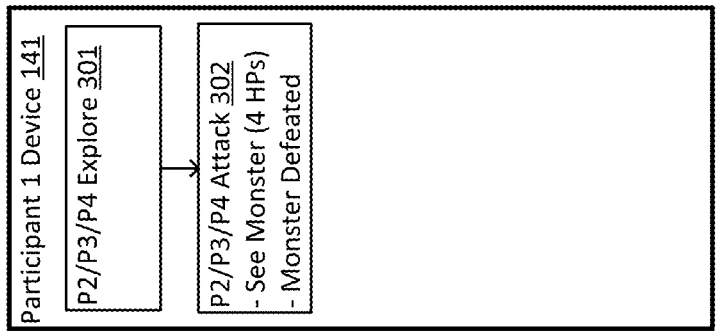

SEMI-SYNCHRONOUS MULTI-PARTICIPANT APPLICATION UPDATES

This is a continuation application and claims the benefit of U.S. patent application Ser. No. 13/224,912, filed Sep. 2, 2011. The contents of this application are hereby incorporated by reference in their entirety.

BACKGROUND

Multi-participant computing applications allow multiple participants using different computing systems to collaboratively accomplish tasks over a communications network. For example, some computing applications may allow shared viewing and editing of documents, so that different participants can view other participants' revisions to a document and provide their own changes to the other participants in real time or near real time. Other computing applications, such as multi-participant gaming applications, allow multiple participants to participate in the same game. Participants in a multi-participant gaming applications may work together in some instances to accomplish a particular objective, may compete with each other in other instances, or may engage in a hybrid combination of the two by working together to accomplish certain game objective while competing against each other to accomplish others.

As the number of participants increases, the resources needed to maintain synchronization and consistency between actions taken by different participants also increases. Synchronization and consistency may be used to ensure that each participant is informed of the actions taken by other participants and/or prevented from taking an action inconsistent with or duplicative of another action previously taken by another participant.

Synchronization and consistency have been preserved in multi-participant applications using real time updating and locks. Real time updating, in which the actions taken by each participant is transmitted in real time to the other participants as the action occurs, consumes increasing resources and bandwidth as the number of participants increases because each update is transmitted to each participant.

Similarly, locking mechanisms, in which a data field or object is locked to participants while a first participant is effecting a change to the object, also consume increasing resources and bandwidth as the number of participants increases. This increased resource and bandwidth demand may be attributable to increased lock-related queries and retry attempts on locked objects as the number of participants increases.

There is a need to reduce the data traffic, bandwidth use, and resources required to synchronize different participant actions in multi-participant applications.

BRIEF DESCRIPTION OF THE DRAWINGS

FIG. 1A shows a first exemplary sequence of events based on different actions taken by different participants in an embodiment of the invention.

FIGS. 2A to 2D shows exemplary replayed sequences of events as they appear to participant 1 in different embodiments based on the events shown in FIG. 1.

DETAILED DESCRIPTION

Figure 1B:
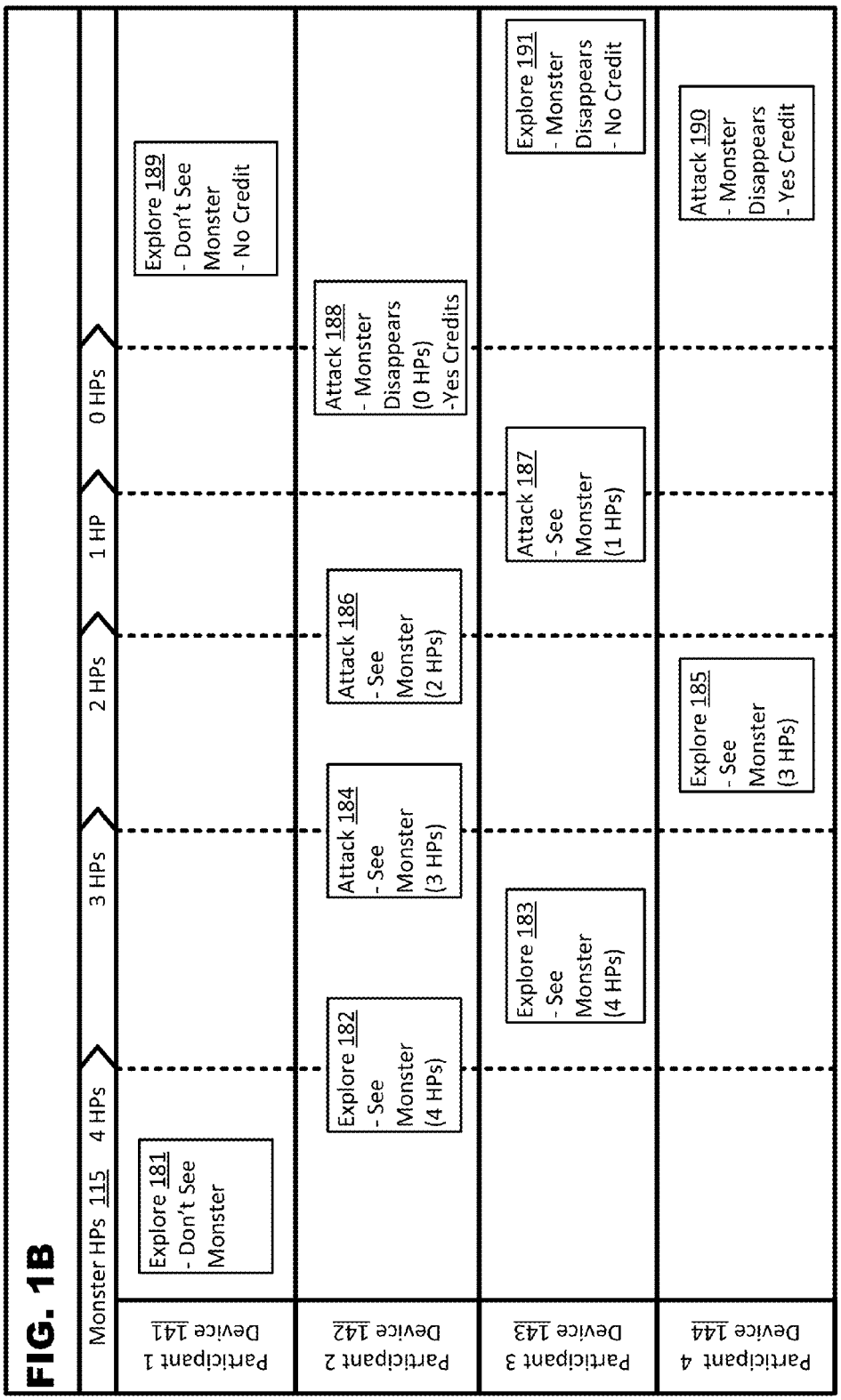
FIG. 1B shows a second exemplary sequence of events based on different actions taken by different participants in an embodiment of the invention.

In an embodiment of the invention, participants may be sent intermittent updates of actions taken by other participants. These updates need not be sent to a participant until the participant has interacted with a specified object in the application. Once the participant has interacted with the specified object, the participant may be sent an update including object interactions of the other participants occurring since the participant's previous object interaction. The update may then be used to inform the participant of these actions taken by the other participants between the participant's interactions.

Since each participant may receive intermittent updates of the actions taken by the other participants, it is possible that inconsistencies may result. For example, if one participant interacts with an object first and then a second participant performs an equivalent interaction with the same object before the second participant receives the update indicating that the first participant already performed the interaction, the application may act as though both participants performed the interaction. The application may represent to both the first and second participants that they each successfully completed that interaction, even though the interaction was actually completed first by the first participant.

FIG. 1A shows an exemplary sequence of events in a timeline 110 of two different participants in a farming game having three interactive game tiles 111 on which crops, fruits, and/or animals may be raised. In this example, participant A may use device A 120, while participant B may use device B 130. These devices may be connected to a central server or cloud based central gaming system through a network.

At time t0, the game may be begin, and both participant devices A and B 120 and 130 show a wheat crop growing in the upper game tile 110. At time t1, participant B may decide to raise cattle in the middle game tile 111. Since participant B has interacted with a game element (in this case the middle game tile object 111), an update may be transmitted to participant B's device 130 reflecting the object interactions of the other participants since participant B's previous interaction with a game element (in this example, the start of the game at time t0 may be deemed participant B's previous interaction).

However, participant A did not interact with any game element objects since the game started at time t0, and this result may be indicated in the update. Therefore, after processing the update at time t2, participant B's device 130 may only show the wheat crop in the upper game tile 111 and the cattle in the middle game tile 111.

At time t3, participant A may decide to plant fruit trees in the lower game tile 111. Since participant A has interacted with a game element (in this case the lower game tile object 111), an update may be transmitted to participant A's device 120 reflecting the object interactions of the other participants since participant A's previous interaction with a game element (in this example, the start of the game at time t0 may be deemed participant A's previous interaction).

Since participant B interacted with the middle game tile 111 at time t1 by raising cattle there, this interaction may be included in the update transmitted to participant A's device 120. Once the update is received and processed at time t4, participant A's device 120 may only show the wheat crop in the upper game tile 111, the cattle in the middle game time 111 added by participant B, and the fruit trees in the lower game tile 111 added by participant A.

At time t5, participant A may decide to interact with the upper tile 111 by harvesting the wheat crop, leaving the upper game tile 111 empty. Since participant A has interacted with a game element (in this case the upper game tile object 111), an update may be transmitted to participant A's device 120 reflecting the object interactions of the other participants since participant A's previous interaction with a game element (in this example, participant A's previous game element interaction was at time t3, when participant A planted fruit trees in the lower game tile 111).

However, between times t3 and t5, participant B did not interact with any game element objects, and this may be indicated in the update. Therefore, after processing the update at time t6, participant A's device 120 may show the empty upper game tile 111 (since participant A harvested the wheat at time t5), the cattle in the middle game time 111 added by participant B at time t1, and the fruit trees in the lower game tile 111 added by participant A at time t3.

At time t7, participant B may decide to plant fruit trees in the lower game tile 111. Since participant B has not interacted with a game element since time t1, it has not received an update showing the object interactions of the other participants since time t1, and therefore may be unaware that at time t3 participant A previously planted fruit trees in the lower game tile 111.

After participant B has interacted with a game element (in this case the lower game tile object 111), an update may be transmitted to participant B's device 130 reflecting the object interactions of the other participants since participant B's previous interaction with a game element (in this example, participant B's previous game element interaction was at time t1, when participant B elected to raise cattle in the middle game tile 111).

Between times t1 and t7, participant A performed two game element object interactions. First, at time t3, participant A decided to plant fruit tress in the lower game tile 111. Later, at time t5, participant A decided to harvest the wheat in the upper game tile 111.

Because participant A's interaction with the lower tile 111 at time t3 to plant fruit trees is equivalent to participant B's interaction with the same lower tile 111 at time t7 to plant fruit trees, in one embodiment, participant A's interaction with the lower tile 111 at time t3 to plant fruit trees may be excluded from the update transmitted to participant B's device 130.

Thus, the update transmitted to participant B's device 130 may only include participant A's interaction with the upper game tile 111 at time t5 to harvest the wheat. This may cause participant B's device 130 to represent to participant B that participant B planted the fruit trees in the lower game tile 111. After processing this update at time t8, participant B's device 130 may show the empty upper game tile 111 (since participant A harvested the wheat at time t5), the cattle in the middle game tile 111 added by participant B at time t1, and the fruit trees in the lower game tile 111 added by participant B at time t7.

Alternatively, in another embodiment, the update transmitted to participant B's device 130 may include both of participant A's interactions with the lower game tile 111 at time t3 to plant the fruit trees and the upper game tile 111 at time t5 to harvest the wheat. Participant B's device 130 may then, when processing the update, identify participant A's interaction with the lower tile 111 at time t3 to plant fruit trees in the update as equivalent to participant B's interaction with the same lower tile 111 at time t7 to plant fruit trees. Participant B's device 130 may then show or otherwise represent the fruit trees in the lower game tile 111 as being planted by participant B.

FIG. 1B shows an exemplary sequence of events at event times 181 to 191 of four game participants 1 to 4, each using a separate computing device 141 to 144, to participate in the game. In this exemplary game, the participants may explore a game map to seek and attack various monsters located in different areas of the map. This example, like the others described herein, is intended to describe some of the features of the invention, and is not intended to limit the scope of the invention to the particular applications described. For example, the invention may also be used in other computing applications, such as document collaboration applications or other applications involving multiple participants working together in a same environment, and not just gaming applications or games involving exploring, attacking, or farming.

At time 181, participant 1 may decide to interact with a game map object by exploring or moving to a first location on the game map. As a result of this exploration, participant 1 does not find any monsters and accordingly participant 1's device 141 does not indicate the presence of any monsters.

At time 182, participant 2 may also decide to interact with a game map object by exploring or moving to a second location on the game map. However, this time, as a result of participant 2's exploration, participant 2 may discover a monster, which may appear on participant 2's device 142 along with a monster hit point (HP) indicator 115, which may indicate, for example, that the monster has four hit points remaining (4 HPs).

Participant 2's device 142 may also receive an update including game element/game object interactions by the participants since participant 2's prior interaction with a game element (or, in the case, since the start of the game just before time 181). Participant 2's device 142 may process the update and indicate, for example, the exploration/first location movement of participant 1 at time 181. In some instances, participant 2 device's may indicate a result of any object interactions with game elements by other participants. In other instances the object interactions of the other participants may be replicated or played back for participant 2 so that participant 2 may see what interactions occurred since participant 2's last interaction with a game element object.

In other instances, only those game element interactions of the participants that have an effect on the other participants may be indicated, replicated, played back, or included in the update transmitted to the other participants. For example, in this situation if participant 1's movement to the first location at time 181 did not affect the other participants' game play, then participant 1's interaction with the game map object at time 181 to move to the first location may not be indicated, replicated, played back, or included in the update transmitted to the other participants, as this action by participant 1 does not affect the others' game play.

At time 183, participant 3 may also decide to interact with a game map object by exploring or moving to a third location on the game map. Although, participant 3 does not discover any monsters as a result of participant 3's movement to the third location, participant 3's device 143 may also receive an update including game element/game object interactions by the participants.

This update may include participant 2's discovery of the monster at time 182, and it may also include participant 1's exploration at time 181, depending on the configuration. After participant 3's device 143 processes the update, participate 3's device 143 may indicate the presence of the monster and it may also indicate that the monster has 4 HPs.

At time 184, participant 2 may decide to attack the monster, causing the monster to lose 1 HP, leaving the monster with 3 HPs. Depending on the embodiment, participant 2's device 142 may, but need not, receive an update including participant 3's exploration at time 183, which in this example, may be the only game element object interaction since participant 2's prior interaction at time 182. If participant 3's exploration at time 183 does not affect participant 2's game play, then in an embodiment, the update, if transmitted to participant 2's device, need not include participant 3's exploration.

However, in other embodiments in which participant 3's exploration at time 183 is included in the update, participant 2's device may be updated to reflect a result of participant 3's exploration and/or participant 2 may be able to replay or otherwise review participant 3's exploration at time 183.

At time 185, participant 4 may also decide to interact with a game map object by exploring or moving to a fourth location on the game map. Although, participant 4 does not discover any monsters as a result of participant 4's movement to the fourth location, participant 4's device 143 may also receive an update including the prior game element/game object interactions by the other participants.

This update may include one or more of the explorations at times 181, 182, and 183 by participants 1, 2, and 3, respectively, and/or it may include participant 2's attack on the monster at time 184. After participant 4's device 144 processes the update, participate 4's device 144 may indicate the presence of the monster and it may indicate that the monster has 3 HPs. Participant may also be able to replay and/or review the prior events 181 to 184 to be informed of the specific game interactions of the other participants, to learn, for example, that it was participant 2 who attacked the monster at time 184 to reduce the HPs of the monster to 3 HPs from 4 HPs.

At time 186, participant 2 may decide to attack the monster again, causing the monster to lose another HP, leaving the monster with 2 HPs. Depending on the embodiment, participant 2's device 142 may, but need not, receive an update including participant 4's exploration at time 185, which in this example, may be the only game element object interaction since participant 2's prior interaction at time 184. If participant 4's exploration at time 185 does not affect participant 2's game play, then in an embodiment, the update, if transmitted to participant 2's device, need not include participant 4's exploration.

However, in other embodiments in which participant 4's exploration at time 185 is included in the update, participant 2's device 142 may be updated to reflect a result of participant 4's exploration and/or participant 2 may be able to replay or otherwise review participant 4's exploration at time 185.

At time 187, participant 3 may decide to attack the monster, causing the monster to lose another HP, leaving the monster with 1 HP. Depending on the embodiment, participant 3's device 143 may receive an update including participant 2's two prior attacks at times 184 and 186, and/or participant 4's prior exploration at time 185, all of which occur since participant 3's prior game object interaction at time 183. After participant 3 attacks and participant 3's device 143 processes the update, particpant 3's device may indicate that the monster has only 1 HP remaining, instead of the 4 HPs shown since the prior update and game element object interaction at time 183. The 1 HP remaining may reflect the two attacks from participant 2 at times 184 and 186 included in the update, as well as the one attack from participant 3 at time 187.

At time 188, participant 2 may decide to attack the monster, causing the monster to lose another HP. After the attack, participant 2's device 142 may be updated with the attack by participant 3 at time 187 that left the monster with one point. Since participant 2's attack also caused the monster to lose another HP, the monster may be now left with 0 HP, and may be defeated. Since the monster has been defeated as a result of participant 2's attack, participant 2 may receive credit and/or a reward for defeating the monster and the monster may disappear from participant 2's view.

In some embodiments, some or all of the reward and/or credit for defeating a monster or performing another action may be shared or split between game participants. For example, the team as a whole could receive a reward, such as a bonus, points, extra turn, and so on, and/or credit. In other embodiments, the reward and/or credit for performing action may be split so that both the team and the individual participants receiving credit for the performing the action receive a reward and/or credit. For example, each participant in the team may receive predetermined points while individual participants may receive additional points based on their individual involvement in performing the action. Alternatively, each of the participants in the team may receive a reward but only those performed the action may receive the credit, or vice versa. In yet another embodiment, both the reward and the credit are reserved only for those participants involved in performing the action. Other reward and credit assignment possibilities may also be used in other embodiments.

At time 189, participant 1 may also decide to interact with a game map object by exploring or moving to a fifth location on the game map. Although, participant 1 does not discover any monsters as a result of participant 1's movement to the fifth location, participant 1's device 141 may also receive an update including the prior game element/game object interactions by the other participants since participant 1's prior interaction at time 181.

In some instances, participant 1 need not see or be informed of the monster since the monster was initially discovered at time 182, after participant 1's prior interaction at time 181, and the monster was defeated at time 188, before participant 1's subsequent interaction at time 189. In this regard, the monster need not affect participant 1's game play, and thus participant 1 need not be informed of the prior discovery and defeat of the monster.

In embodiments where only those participants who participate in attacking the monster receive credit, participant 1 need not receive any credit since participant 1 did not attack the monster. Alternatively, participant 1 may receive credit if the credit is distributed to each of the participants irrespective of the independent contribution to defeating the monster.

In other embodiments, however, the update include the prior interactions of the other participant may be used to enable participant to replay or otherwise review the interactions of the other participants since participant 1's prior interaction with a game element object at time 181. During this review, participant 1 may be informed that participant 2 discovered the monster at time 182, participant 2 attacked the monster at times 184 and 186, participant 3 attacked the monster at time 187, and then participant 2 attacked the monster again at time 188 to finally defeat the monster. Participant 1 may also be informed in some embodiments that participant 3 explored the game map at time 183 and participant 4 explored the game map at time 185. The specific interactions of the other participants that are included in the replay or review may vary in different embodiments depending on the replay criteria selected.

At time 190, participant 4 may decide to attack the monster. Although the monster may have since been defeated by participant 2 at time 188, participant 4's device 144 may still indicate the presence of the monster with 3 HPs remaining since participant 4's device has not received an update since time 185, well before the monster was defeated at time 188.

After participant 4 attacks at time 190, participant 4's device may receive an update including the interactions of the other participants since participant 4's prior interaction at time 185.

Although the monster has already been defeated at time 188 by participant 2, participant 4 may still get credit for attacking and defeating the monster at time 190, since participant 4's device 144 indicated at the time of attack that the monster still had 3 HPs remaining. Thus, in this situation, participant 4 may receive an indication that he defeated the monster at time 190, along with the appropriate credit for participant 4's contribution in defeating the monster. This indication that participant 4 defeated the monster may be triggered in multiple ways.

First, the processing device preparing the update for transmission to participant 4's device 144 at about or after time 190 may exclude the last attack on the monster at time 188 by participant 2, so that participant 4's attack at time 190 appears to be the cause of the monster's defeat at time 190. Alternatively, participant 4's device 144 may ignore or exclude the last attack on the monster at time 188 by participant 2 as included in the update transmitted to participant 4's device 144, so that participant 4's attack at time 190 appears to be cause of the monster's defeat at time 190. In yet another embodiment, participant 4's attack at time 190 may be merged with participant 2's attack at time 188 so that it appears to participant 4 that both participant 2 and participant 4 jointly defeated the monster.

Each of these scenarios may cause inconsistencies between the experiences of different participants. For example, participant 2 may believe that he alone killed the monster at time 188. Participant 1 may not even be aware of the monster's existence, but assuming participant 1 watches a replay or review of events between times 181 and 189, participant 1 will also believe that participant 2 defeated the monster at time 188. If participant 4 later attacks the monster at time 190 and receives credit for defeating the monster for attack at time 190, participant 4 may believe that he alone defeated the monster (or he and participant 2 jointly defeated the monster if the two attacks are merged together). Thus, participant 4's perception is different from that of participant 1 and 2.

To avoid this, each of the participants may receive credit for defeating the monster. This may be accomplished through a generic message crediting the entire team for defeating the monster. In some instance, when a participant attacks the monster, an animation may also show other participants who either see the monster or are capable of attacking the monster as attacking the monster. This may minimize conflicts similar to that of participant 4's belated attack at time 190, in which participants 1 and 2 may be led to believe that participant 2 defeated the monster (with assistance from participant 3 at time 187), while participant 4 may be led to believe that participant 4 defeated the monster (with assistance from participants 2 and 3 at time 184, 186, and 187). In some instances, participants who performed certain actions, such as attacking the most or being the first to land the fatal attack leading to the monster's defeat, may receive a bonus or special recognition to reward those taking extra initiative.

In other instances, the other participants may receive a future notification, through a subsequent update, that another participant also received credit for interacting with an object. For example, the other participants may be informed through subsequent updates after time 190 that participant 4 also assisted in attacking the monster.

A timeout algorithm may also be used in some instances, so that each participants device is automatically updated in certain circumstances if the participant fails to interact with a game element object within a predetermined time. Thus, in the aforementioned case involving participant 4's belated attack on the monster, if participant 4 does not attack the monster within a predetermined period after the monster is defeated by participant 2 at time 188, participant 4's device 144 may receive an additional update indicating that participant 2 has already defeated the monster (at time 188). When participant 4's device 144 processes the update, it may then remove or disable the monster to prevent further belated attacks by participant 4.

At time 191, participant 3 may also decide to interact with a game map object by exploring or moving to a sixth location on the game map. Although, participant 3 does not discover any monsters as a result of participant 1's movement to the sixth location, participant 3's device 143 may also receive an update including the prior game element/game object interactions by the other participants since participant 3's prior interaction at time 187. This update may include the attacks on the monster by participants 2 and 4 at times 188 and 190, respectively. In other embodiments, the update may also include participant 1's exploration at time 189.

After processing the update, participant 3's device 143 may remove or otherwise indicate the defeat of the monster to participant 3. In some embodiments, this removal or other indication of defeat may be specified in or determined from the update. In some instances, participant 3's device 143 may indicate, as a resulting of processing the update, that participants 2 and/or 4 defeated the monster. The device 143 may indicate that participant 2 attacked and/or defeated the monster at time 188 and participant 4 attacked and/or defeated the monster at time 190. In other instances, participant 4's attack at time 190 may be merged with participant 2's attack at time 188 in the update, so that it appears to participant 3 that both participant 2 and 4 attacked/defeated the monster at time 188. In another instance, participant 3's attack at time 187 may be merged with participant 2's attack at time 188 and participant 4's attack at time 190 in the update so it appears as though all three participants 2, 3, and 4 attacked/defeated the monster at time 188. Alternatively, if only participant 2 is to receive credit for defeating the monster at time 188, the update may exclude participant 4's attack at time 190.

Depending on the configuration, participant 3 may receive full, partial, or no credit or reward for participating in the attack of the monster. For example, participant 3 may receive partial credit for attacking the monster at time 187 or full credit for being part of the team that defeated the monster in some instances. However, in other instances participant 3 need not receive any credit for defeating the monster because participant 3 chose to explore at time 191 instead of attacking the monster, which appeared to participant 3's device as if the monster was still undefeated with 1 HP remaining immediately at time 191 when participant 3 chose to explore instead of attack.

FIGS. 2A to 2D shows exemplary replayed sequences of events as they appear to participant 1 in different embodiments based on the events shown in FIG. 1. These replayed sequences of events may be based on data included in an update that is transmitted to, received at, and processing by participant 1's device 141 after participant 1 decides to interact with the game map object to explore the game map at time 189. The update may include interactions of the other participants, participants 2, 3, and 4, that occur since participant 1's prior interaction with a game element object at time 181.

For example, in FIG. 2A, the update processed by participant 1's device 141 may indicate to participant 1 that: Participant 2 discovered the monster having 4 HPs when exploring a second location of the game map (at time 182). Then, participant 3 explored a third location of the game map (at time 183). Next, participant 2 attacked the monster (at time 184), leaving the monster with 3 HPs. Participant 4 then explored a fourth location of the game map (at time 185). After that, participant 2 attacked the monster again (at time 186) leaving the monster with 2 HPs. Participant 3 then attacked the monster (at time 187), leaving the monster with 1 HP. Finally, participant 2 attacked the monster (at time 188) to finally defeat the monster. In this example, it will appear to participant 1 that participant 2 was responsible for defeating the monster, with help from participant 3.

FIG. 2B shows an alternative reconstruction of events specified in the update to indicate shared credit between participants 2 and 3 for defeating the monster, as the separate attacks of participants 2 and 3 may be merged into combined attacks. In FIG. 2B, the update processed by participant 1's device 141 may indicate to participant 1 that: Participant 2 discovered the monster having 4 HPs when exploring a second location of the game map (at time 182). Then, participant 3 explored a third location of the game map (at time 183). Next, both participants 2 and 3 appear to have attacked the monster (at time 184), leaving the monster with 3 HPs. Participant 4 then explored a fourth location of the game map (at time 185). After that, participants 2 and 3 appear to have attacked the monster again repeatedly (at time 186) to finally defeat the monster. In this example, it will appear to participant 1 that participants 2 and 3 were equally responsible for defeating the monster.

FIG. 2C shows an alternative reconstruction of events specified in the update to indicate shared credit between each of the participants 2, 3, and 4, who either attacked the monster between times 181 and 189 or who had an opportunity to belatedly attack the monster after time 189, for defeating the monster. In FIG. 2C, the update processed by participant 1's device 141 may indicate to participant 1 that: Participant 2 discovered the monster having 4 HPs when exploring a second location of the game map (at time 182). Then, participant 3 explored a third location of the game map (at time 183). Next, participants 2, 3, and 4 appear to have attacked the monster (at time 184), leaving the monster with 3 HPs. Participant 4 then explored a fourth location of the game map (at time 185). After that, participants 2, 3, and 4 appear to have attacked the monster again repeatedly (at time 186) to finally defeat the monster. In this example, it will appear to participant 1 that participants 2, 3, and 4 were equally responsible for defeating the monster, even though participant 4 did not actually attack the monster between times 181 and 189.

FIG. 2D shows an alternative reconstruction of events specified in the update to provide a quick summary of events and indicate shared credit between each of the participants 2, 3, and 4, who either attacked the monster between times 181 and 189 or who had an opportunity to belatedly attack the monster after time 189, for defeating the monster. In FIG. 2D, each of the object interactions may be consolidated by the type of interaction, such as exploration of the game map or attack of the monster. In this embodiment, each of the explorations of the second, third, and fourth locations by participants 2, 3, and 4, at times 182, 183, and 185 respectively, may be merged into a single exploration event 301. The single exploration event 301 may simultaneously indicate, in a single consolidated instance, each of the three independent explorations of participants 2, 3, and 4 that actually occurred at different times.

Each of the attacks on the monster by participants 2 and 3 times 184, 186, and 187 may also be merged into a single attack event 302. The single attack event 302 may indicate in an single consolidated instance an attack on the monster by participants 2, 3, and/or 4, leading to the monster's defeat.

The single exploration event 301 and single attack event 302 may be presented to participant 1 sequentially, such as by first depicting the exploration event 301 on a game map shown on a display device to participant 1 and then showing the attack event 302 on the display device to participant 1. The single exploration event 301 and single attack event 302 may also be presented to participant 1 simultaneously, such as by depicting the exploration event 301 on a game map shown on a display device to participant 1 and showing the attack event 302 in a separate region on the display device to participant 1.

Figure 3:
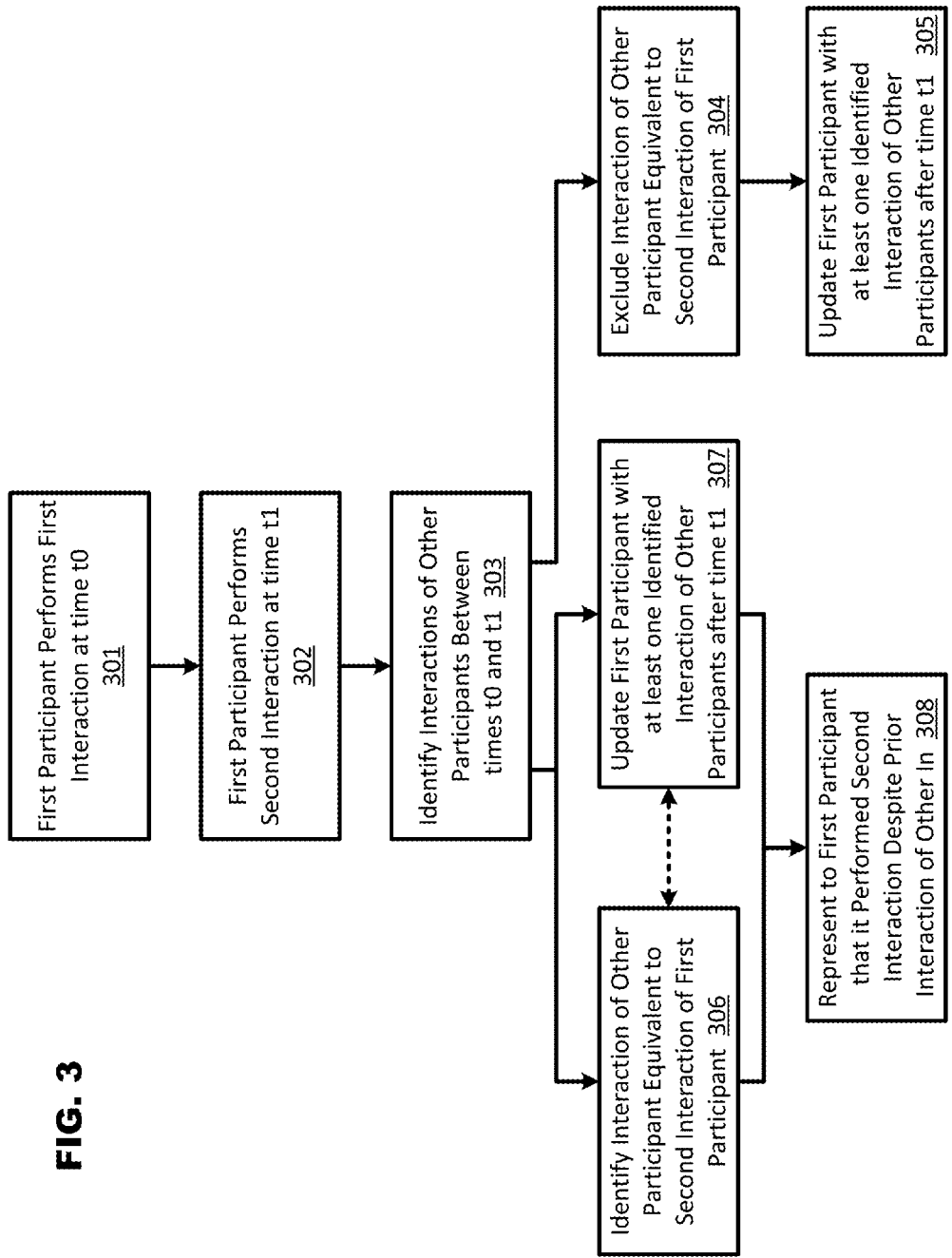
FIG. 3 shows an exemplary process in an embodiment.

FIG. 3 shows an exemplary process in an embodiment of the invention. In box 301, a first participant may interact with a first object in the application at time t0, such as a game element during game play. In box 302, the same participant may, at a later time t1, interact with the same or another object in the application. In box 303, the application may identify interactions of the other participants that occurred between the two interactions of the first participant at times t0 and t1.

Boxes 304 and 305 show a first alternative process, while boxes 306 to 308 show a second alternative process.

In box 304, the interactions of the other participants between times t0 and t1 identified in box 303 may be compared to the interaction of the first participant at time t1 in box 302 to identify at least one interaction of the other participants between times t0 and t1 that is equivalent to the interaction of the first participant at time t1. In box 304, an interaction of the other participants identified as equivalent may be excluded from the list of identified interactions of the other participants between times t0 and t1 in box 403.

In box 305, an update may be generated and sent to the first participant's device based on the identified interactions of the other participants between times t0 and t1, excluding the identified equivalent interaction in box 304. The first participant's device may then process the update to replay, review, or otherwise inform the first participant after time t1 of the other participants' interactions occurring between the first participant's successive interactions at times t0 and t1. Conflicts and inconsistencies may be avoided by eliminating the equivalent interactions of the other participants to the first participant's interaction at time t1. By doing so, the first participant's device may credit the first participant with performing the interaction at time t1 in box 302 without informing the first participant that another participant had previously performed an equivalent interaction between times t0 and t1.

In box 306 associated with the second alternative process, the interactions of the other participants between times t0 and t1 identified in box 303 may be compared to the interaction of the first participant at time t1 in box 302 to identify at least one interaction of the other participants between times t0 and t1 that is equivalent to the interaction of the first participant at time t1.

In box 307, an update may be generated and sent to the first participant's device based on the identified interactions of the other participants between times t0 and t1 as determined in box 303.

The identification of equivalent interactions by the other participants in box 306 may be performed before or after the update in box 307 is generated and sent to the first participant's device. If the identification in box 306 is made before the update is generated, the update may include an identification of the equivalent interactions determined in box 306. If the identification in box 306 is made after the update is generated and sent to the participant's device, then the participant's device may perform the identification in box 306.

The update in box 307 and the identification of equivalent interactions of other participants in box 306 may then both be used in box 308 to create a representation to the first participant that the first participant performed the second interaction and/or received credit for the second interaction even if another participant performed the equivalent interaction before time t1 when the first participant performed the interaction.

Figure 4:
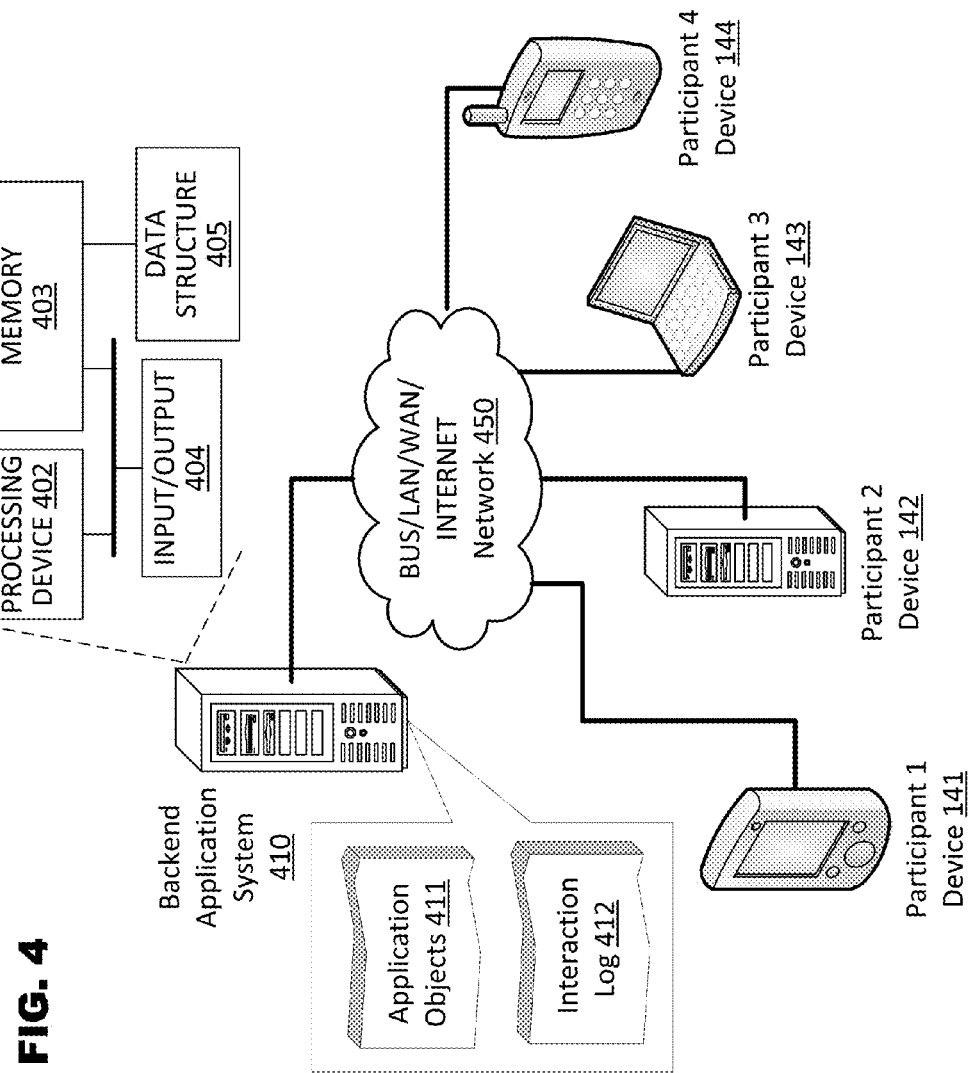
FIG. 4 shows an exemplary architecture in an embodiment.

FIG. 4 shows an exemplary architecture in an embodiment of the invention. Backend application system 410 may include a multi-participant application having a set of application objects 411 that the participants may be able to interact with. Backend application system 410 may also include an interaction log 412 for storing records of object interactions of different participants. These records may include a participant identifier, an interaction time, an object identifier, and a type of interaction identifier. The log 412 may be used to identify interactions occurring of certain participants occurring within a particular timeframe, such as the interactions of the other participants between times t0 and t1 as previously discussed. The log 412 may also be used to identify and/or exclude equivalent interactions of other participants as previously discussed.

Backend application system 410 may be connected to a network 450. Network 450 may include a LAN, WAN, bus, or the Internet and may include connectivity through any transmission medium, including, but not limited to, wireless, optical, and radio. Each of the four participant devices 141 to 144 may also be connected to network 450 to communicate with the backend application system 410.

Backend application system 410 may interface with other systems and components. For example, a network/data storage device may be used to store the application objects 411 and/or interaction log 412. The storage device may contain a hard disk drive, flash memory, or other computer readable media capable of storing data.

Each of the systems 410 and devices 141 to 144 in FIG. 4 may contain a processing device 402, memory 403 storing loaded data or a loaded data structure 405, and a communications device 404, all of which may be interconnected via a system bus. In various embodiments, each of the systems and devices 410 and 141 to 144 may have an architecture with modular hardware and/or software systems that include additional and/or different systems communicating through one or more networks.

Communications device 404 may enable connectivity between the processing devices 402 in each of the systems and the network 450 by encoding data to be sent from the processing device 402 to another system or device over the network 450 and decoding data received from another system over the network 450 for the processing device 402.

In an embodiment, memory 403 may contain different components for retrieving, presenting, changing, and saving data. Memory 403 may include a variety of memory devices, for example, Dynamic Random Access Memory (DRAM), Static RAM (SRAM), flash memory, cache memory, and other memory devices. Additionally, for example, memory 403 and processing device(s) 402 may be distributed across several different computers that collectively comprise a system.

Processing device 402 may perform computation and control functions of a system and comprises a suitable central processing unit (CPU). Processing device 402 may include a single integrated circuit, such as a microprocessing device, or may include any suitable number of integrated circuit devices and/or circuit boards working in cooperation to accomplish the functions of a processing device. Processing device 402 may execute computer programs, such as object-oriented computer programs, within memory 403.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments discuss the use two or four participant devices by two or four participants, but in other embodiments, different numbers of participant devices and/or participants may be used. Additionally, in FIG. 4, the backend application system 410 is shown as a separate from each of the participant devices 141 to 144, though in other embodiments the functionality of the backend application system may be integrated into one or more participant devices.

We claim:

1. A method for updating a computing application at a game device participating in a multi-participant computing application game comprising:
   transmitting, from the game device of a first participant in the multi-participant computing application game, data indicating a second object interaction by the first participant occurring after a first object interaction by the first participant; and
   after said transmitting, receiving update data at the game device of the first participant, said update data identifying at least one object interaction by a second participant in the multi-participant computing application game occurring between the first and the second object interactions by the first participant;
   if an identified object interaction by the second participant is not identical to the second object interaction by the first participant, replicating the identified object interaction of the received update data at the game device of the first participant; and
   otherwise, if an identified object interaction by the second participant is identical to the second object interaction by the first participant, instructing the game device of the first participant to appear to the first participant as though the first participant performed the identified object interaction even though the identified object interaction was previously performed by the second participant and appeared to the second participant as though the second participant performed the identified object interaction.

2. The method of claim 1, further comprising:
   when at least one object interaction by the second participant is directed to a same object as the second object interaction by the first participant, excluding replication of the at least one object interaction by the second participant.

3. The method of claim 2, wherein replication of the at least one object interaction by the second participant is excluded when the at least one object interaction by the second participant is an identical object interaction to the second object interaction by the first participant.

4. The method of claim 2, wherein replication of the at least one object interaction by the second participant is excluded when the at least one object interaction by the second participant causes an identical outcome in the multi-participant computing application game to the second object interaction by the first participant.

5. The method of claim 2, wherein the update data does not include the at least one object interaction by the second participant excluded from replication.

6. A non-transitory computer readable medium having a computer program including program codes which, when executed by a processor, execute a method for updating a computing application at a game device participating in a multi-participant computing application game, the method comprising:

transmitting, from the game device of a first participant in the multi-participant computing application game, data indicating a second object interaction by the first participant occurring after a first object interaction by the first participant;

after said transmitting, receiving update data at the game device of the first participant, said update data identifying at least one object interaction by a second participant in the multi-participant computing application game occurring between the first and the second object interactions by the first participant;

if an identified object interaction by the second participant is not identical to the second object interaction by the first participant, replicate the identified object interaction of the received update data at the game device of the first participant; and otherwise, if an identified object interaction by the second participant is identical to the second object interaction by the first participant, instruct the game device of the first participant to appear to the first participant as though the first participant performed the identified object interaction even though the identified object interaction was previously performed by the second participant and appeared to the second participant as though the second participant performed the identified object interaction.

7. The non-transitory computer readable medium of claim 6, further comprising:

when at least one object interaction by the second participant is directed to a same object as the second object interaction by the first participant, excluding replication the at least one object interaction by the second participant.

8. The non-transitory computer readable medium of claim 7, wherein the replication of the at least one object interaction by the second participant is excluded when the at least one object interaction by the second participant is an identical object interaction to the second object interaction by the first participant.

9. The non-transitory computer readable medium of claim 7, wherein replication of the at least one object interaction by the second participant is excluded when the at least one object interaction by the second participant causes an identical outcome in the multi-participant computing application game to the second object interaction by the first participant.

10. The non-transitory computer readable medium of claim 7, wherein the update data does not include the at least one object interaction by the second participant excluded from replication.

11. A participant game device comprising:

a processing device; and a network interface to send data to and receive data from a backend application system;

wherein the network interface is to transmit data indicating a second object interaction by a first participant from the participant game device in a multi-participant computing application occurring after a first object interaction by the first participant;

the network interface is to receive update data, said update data identifying at least one object interaction by a second participant in the multi-participant computing application occurring between the first and the second object interactions by the first participant;

wherein said participant game device is to replicate an identified object interaction of the update data received at the participant game device if an identified object interaction by the second participant is not identical to the second object interaction by the first participant, and otherwise, the participant game device is to instruct the game device of the first participant to appear to the first participant as though the first participant performed the identified object interaction even though the identified object interaction was previously performed by the second participant and appeared to the second participant as though the second participant performed the identified object interaction.

12. The participant game device of claim 11, wherein when at least one object interaction by the second participant is directed to a same object as the second object interaction by the first participant, said participant game device is to exclude replication of the at least one object interaction by the second participant.

13. The participant game device of claim 12, wherein replication of the at least one object interaction by the second participant is excluded when the at least one object interaction by the second participant is an identical object interaction to the second object interaction by the first participant.

14. The participant game device of claim 12, wherein replication of the at least one object interaction by the second participant is excluded when the at least one object interaction by the second participant causes an identical outcome in the multi-participant computing application game to the second object interaction by the first participant.

15. The participant game device of claim 12, wherein the update data does not include the at least one object interaction by the second participant excluded from replication.

\* \* \* \* \*